(12) United States Patent
Sutskover et al.

(10) Patent No.: US 8,412,096 B2
(45) Date of Patent: *Apr. 2, 2013

(54) BIDIRECTIONAL ITERATIVE BEAM FORMING

(75) Inventors: Ilan Sutskover, Hadera (IL); Assaf Kasher, Haifa (IL); Quinghua Li, Sunnyvale, CA (US); Huaning Niu, Milpitas, CA (US)

(73) Assignee: Intel Corporation, Santa Clara, CA (US)

( * ) Notice: Subject to any disclaimer, the term of this patent is extended or adjusted under 35 U.S.C. 154(b) by 74 days.

This patent is subject to a terminal disclaimer.

(21) Appl. No.: 12/939,417

(22) Filed: Nov. 4, 2010

(65) Prior Publication Data

US 2011/0045785 A1 Feb. 24, 2011

Related U.S. Application Data

(63) Continuation of application No. 12/262,904, filed on Oct. 31, 2008.

(60) Provisional application No. 61/035,480, filed on Mar. 11, 2008.

(51) Int. Cl.
*H04B 7/14* (2006.01)
*H04B 7/00* (2006.01)
*H04B 1/38* (2006.01)
*H04M 1/00* (2006.01)

(52) U.S. Cl. .......... 455/25; 455/524; 455/525; 455/561; 455/562.1

(58) Field of Classification Search ............... 455/562.1, 455/561, 560, 524, 525
See application file for complete search history.

(56) References Cited

U.S. PATENT DOCUMENTS

| 7,013,165 | B2 * | 3/2006 | Yoon et al. ..................... 455/561 |
| 7,738,925 | B2 * | 6/2010 | Nguyen et al. ............. 455/562.1 |
| 2004/0157646 | A1 | 8/2004 | Raleigh et al. |
| 2007/0121751 | A1 | 5/2007 | Li et al. |
| 2007/0165736 | A1 | 7/2007 | Wang et al. |
| 2008/0240031 | A1 * | 10/2008 | Nassiri-Toussi et al. ...... 370/329 |
| 2008/0254752 | A1 * | 10/2008 | Oh et al. ......................... 455/83 |
| 2009/0233545 | A1 * | 9/2009 | Sutskover et al. .............. 455/25 |
| 2010/0020702 | A1 | 1/2010 | Wong et al. |
| 2011/0045785 | A1 * | 2/2011 | Sutskover et al. .............. 455/69 |

FOREIGN PATENT DOCUMENTS

| EP | 1816759 | 8/2007 |
| JP | 08167871 | 6/1996 |
| JP | H08167871 | 6/1996 |
| JP | 2003051803 | 2/2003 |
| JP | 2003179585 | 6/2003 |

(Continued)

OTHER PUBLICATIONS

Office Action received for Japanese Patent Application No. 2010-550840, received Dec. 18, 2012, 3 pages including 2 pages English translation.

*Primary Examiner* — Tilahun B Gesesse
(74) *Attorney, Agent, or Firm* — Kacvinsky Daisak, PLLC

(57) ABSTRACT

Bidirectional iterative beam forming techniques are described. An apparatus may include a wireless device having an antenna control module operative to initiate beam formation operations using an iterative training scheme to form a pair of communications channels for a wireless network, the antenna control module to communicate training signals and feedback information with a peer device via the transceiver and phased antenna array using partially or fully formed high rate channels, and iteratively determine antenna-array weight vectors for a directional transmit beam pattern for the phased antenna array using feedback information from the peer device.

18 Claims, 12 Drawing Sheets

FOREIGN PATENT DOCUMENTS

| | | |
|---|---|---|
| KR | 5089698 | 9/2005 |
| WO | 0117131 | 3/2001 |
| WO | 2005011146 | 2/2005 |
| WO | 2006129958 | 12/2006 |
| WO | 2006135653 | 12/2006 |
| WO | 2009114631 | 9/2009 |

* cited by examiner

1000 initiate beam formation operations using a power iteration scheme to form a pair of communications channels for a wireless personal area network
1002 communicate training information and feedback information between a first device and a second device using only high rate physical channels
1004 determine antenna-array weight vectors for a directional transmit beam pattern for a phased antenna array of the first device using feedback information from the second device
1006

Logic
1104

STORAGE
MEDIUM

FIG. 11

BIDIRECTIONAL ITERATIVE BEAM FORMING

BACKGROUND

Wireless communication systems communicate information over a shared wireless communication medium such as one or more portions of the radio-frequency (RF) spectrum. Recent innovations in Millimeter-Wave (mmWave) communications operating at the 60 Gigahertz (GHz) frequency band promises several Gigabits-per-second (Gbps) throughput within short ranges of approximately 10 meters. Because of the large signal attenuation and limited transmission power, many 60 GHz devices will rely on antenna arrays with high directivity gain to achieve the 10 meter coverage. These devices use techniques to steer a "beam" from a transmitter antenna array around obstacles to find the best path to a receiver antenna array, thereby directing much of the antenna gain towards the receiver antenna array. Techniques to discover and direct energy between antenna arrays of peer devices is typically referred to as "beam forming" or "beam steering" or "beam searching." Beam forming generally attempts to steer an antenna beam at a transmitter while at the same time focusing a receiver antenna in the direction of incoming power from the transmitter. Conventional beam forming protocols, however, typically take a significant amount of training time before a final high-speed communication channel is established between peer devices. Consequently, techniques designed to reduce overhead associated with training time are desirable.

BRIEF DESCRIPTION OF THE DRAWINGS

FIG. 10 illustrates one embodiment of a logic flow.

FIG. 11 illustrates one embodiment of an article of manufacture.

DETAILED DESCRIPTION

Figure 1:
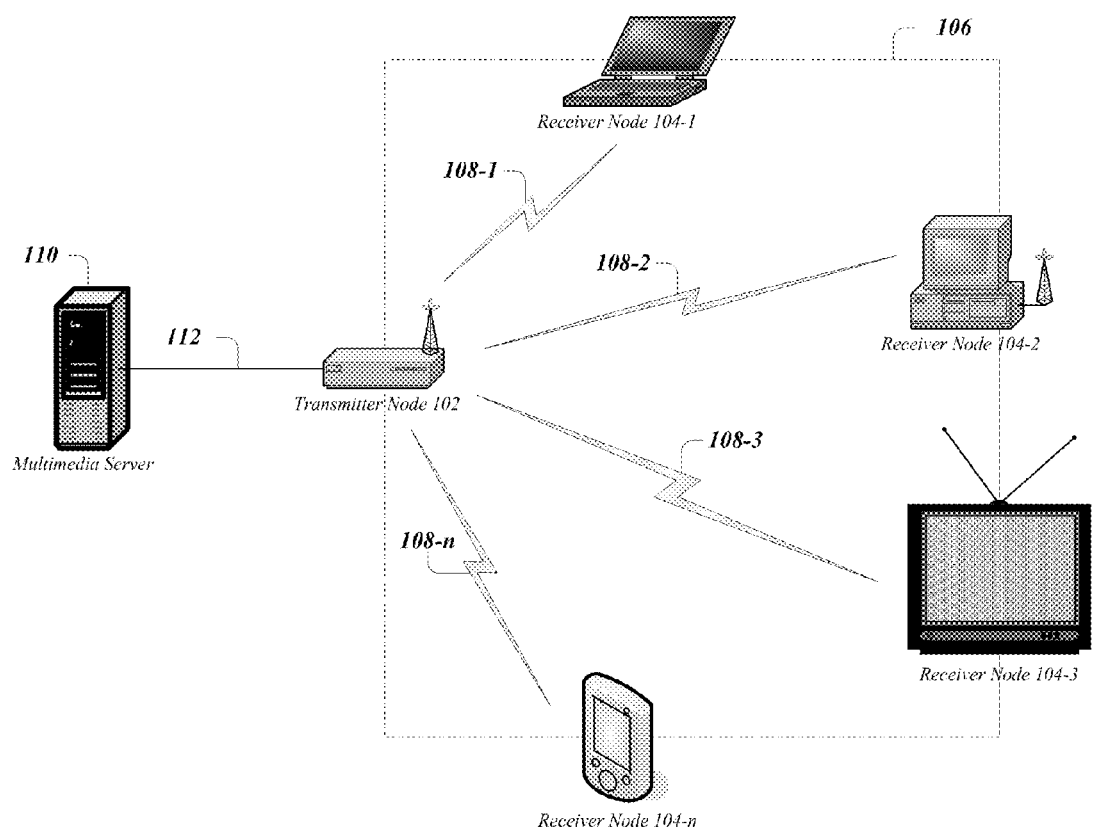
FIG. 1 illustrates one embodiment of a communications system.

Various embodiments may be generally directed to bidirectional iterative beam forming techniques for wireless communication systems. Some embodiments may be particularly directed to an enhanced bidirectional beam forming protocol designed to concurrently generate bidirectional communication channels between two or more wireless devices over a wireless network, such as a 60 Ghz mmWave wireless video area network (WVAN) or wireless personal area network (WPAN), for example. Such networks are sometimes referred to as "piconets" due to their limited transmission ranges and participating devices. The enhanced bidirectional beam forming protocol generates additional antenna gain for directional antenna transmissions, thereby allowing training and feedback information to be communicated at a higher data rate, resulting in reduced training time and overhead in setting up bidirectional communication channels between two wireless devices.

Since the path loss at 60 GHz band is relatively high and the efficiency of power amplifiers at 60 GHz is relatively low (e.g., CMOS power amplifiers), directional transmission is needed to achieve the desired coverage area (e.g., approximately 10 meters). Namely, the antenna array gain from both transmit and receive beam forming is needed to acquire the signal-to-noise ratio (SNR) for reliable data communications. A beam forming protocol is typically used to find the optimal phase values which maximize receiver SNR, received power or other criterion.

Currently, there are several different types of beam forming protocols for implementing directional transmission techniques. A first directional transmission technique is referred to as a sector scan. It forms several directional beams using predefined weights. Calibration is required, however, in order to form the requisite beams. Another technique is based on singular value decomposition (SVD), which typically does not require calibration. SVD allows transmission over selected singular values by using the singular vectors for antenna patterns. In particular, the singular vector associated with the largest Eigen value typically works well. It is worthy to note, however, that in order to select the singular values and singular vectors, a device typically has to have an estimation of the entire MIMO channel, e.g., the channel from every antenna element at the transmitter to every antenna element at the receiver end. While the SVD technique provides improved performance, it needs feedback information due to lack of channel reciprocity. This potentially introduces channel delay into the SVD directional transmission technique.

A piconet typically implements two general types of communications transmissions, each having different transmission envelopes or characteristics. For example, a first type of transmission may be a directional transmission and a second type of transmission may be an omni-directional transmission. The different types of transmissions may occur at different transmission rates. For example, directional transmissions may be performed using a higher rate channel, and the second type of transmission may be performed using a lower rate channel. In a WirelessHD network, for example, the directional transmissions may be performed using a high rate physical (HRP) channel, and the second type of transmission may be performed using a low rate physical (LRP) channel. The HRP channel may achieve a higher rate than the LRP channel, in part, through the utilization of larger amounts of bandwidth.

Since the location of a pair of devices is unknown during initialization, conventional techniques typically utilize a combination of LRP channels and HRP channels for beam forming operations. For example, one conventional technique utilizes a beam forming protocol for phased array antennas that is based on an iterative training scheme. In one embodiment, for example, the iterative trainings scheme may comprise a power iteration scheme. This beam forming protocol designed for one way high rate data transmissions over a HRP channel, where the reverse link suffers from low rate data transmissions over a LRP channel. Feedback information for the iterative search process is transmitted over the LRP channel, which dramatically slows down beam forming operations. This may be acceptable for applications where high rate data transmissions are needed in only one direction, such as for video traffic from a media source to a media sink. For applications where high rate data communications are needed in both directions, such as for computing centric applications, however, this introduces unwarranted delay in beam forming operations.

To solve these and other problems, various embodiments implement an enhanced bidirectional beam forming protocol to perform bidirectional beam forming operations to reduce training overhead and link latency during beam forming operations. Some embodiments delay feedback information until two-way transmit (or receive) beam forming weights are trained, and then send the feedback over a beam formed link with a higher rate (e.g., HRP channel). This may reduce or eliminate the need to use a LRP channel for beam forming operations. Additionally or alternatively, some embodiments interleave transmit and receive beam forming operations to allow use of partially trained links to communicate feedback information at a higher data rate. This reduces the need to use an LRP channel during beam forming operations.

In one embodiment, for example, a wireless device may include a phased antenna array communicatively coupled to a transceiver. The wireless device may further include an antenna control module communicatively coupled to the transceiver and the phased antenna array. The antenna control module may be arranged to perform beam formation operations using an iterative training scheme to form a pair of communications channels between the wireless device and a peer device. For example, the antenna control module may be arranged to communicate training signals and feedback information with the peer device via the transceiver and phased antenna array. The information is communicated using almost exclusively high rate channels, or through partial use of low rate channels to bootstrap setup of the high rate channels. This reduces training time for the devices. The antenna control module iteratively determines antenna-array weight vectors (AWVs) for a directional transmit beam pattern for the phased antenna array using feedback information from the peer device. Once trained the wireless devices may be used for high-speed bidirectional data communications.

Additionally or alternatively, the antenna control module of a wireless device may initiate bidirectional beam formation operations using an iterative training scheme to form a pair of communications channels for a wireless network. The antenna control module may be arranged to interleave transmit and receive beam forming operations for a first wireless device and a second wireless device to allow feedback information received by the first wireless device from the second wireless device to be communicated over a higher data rate channel (e.g., HRP channel).

The wireless devices as described herein may coordinate operations between each other. The coordination may involve the uni-directional or bi-directional exchange of information. In some embodiment, the information can be implemented as signals. For example, training information may comprise training signals or sequences. Further embodiments, however, may alternatively employ data messages. The terms "training information" and "feedback information" are meant to include both signals and data messages, depending on a given implementation. The embodiments are not limited in this context.

Embodiments of the enhanced bidirectional beam forming protocol provide several advantages over conventional beam forming techniques. For example, the enhanced bidirectional beam forming protocol trains both directions of the communications link, allowing for a more structured process prior to a bidirectional operation that is more symmetric, such as in a PC environment. This provides superior performance relative to conventional beam forming protocols that allows the receiver of the high rate transmission to answer (e.g., ACKs etc.) in a low rate dedicated physical layer (PHY) that may not require training of the reverse link. In another example, the enhanced bidirectional beam forming protocol exploits resources more efficiently. The feedback provided during each iteration is based on partially trained antenna arrays. In yet another example, an external listening device can identify transmissions from both ends of the link. This situation is beneficial when an independent station wishes to assess the amount of interference it is going to suffer from the regarded link. If only one side of the link does the transmission, however, then the station has knowledge about interference only about the forward link and not about the reverse link. These are only a few examples of the advantages provided by the enhanced bidirectional beam forming protocol, and it may be appreciated that many other advantages exist as well.

FIG. 1 illustrates a block diagram of one embodiment of a communications system 100. In various embodiments, the communications system 100 may comprise multiple nodes. A node generally may comprise any physical or logical entity for communicating information in the communications system 100 and may be implemented as hardware, software, or any combination thereof, as desired for a given set of design parameters or performance constraints. Although FIG. 1 may show a limited number of nodes by way of example, it can be appreciated that more or less nodes may be employed for a given implementation.

In various embodiments, the communications system 100 may comprise, or form part of a wired communications system, a wireless communications system, or a combination of both. For example, the communications system 100 may include one or more nodes arranged to communicate information over one or more types of wired communication links. Examples of a wired communication link, may include, without limitation, a wire, cable, bus, printed circuit board (PCB), Ethernet connection, peer-to-peer (P2P) connection, backplane, switch fabric, semiconductor material, twisted-pair wire, co-axial cable, fiber optic connection, and so forth. The communications system 100 also may include one or more nodes arranged to communicate information over one or more types of wireless communication links. Examples of a wireless communication link may include, without limitation, a radio channel, infrared channel, radio-frequency (RF) channel, Wireless Fidelity (WiFi) channel, a portion of the RF spectrum, and/or one or more licensed or license-free frequency bands.

The communications system 100 may communicate information in accordance with one or more standards as promulgated by a standards organization. In one embodiment, for example, various devices comprising part of the communications system 100 may be arranged to operate in accordance with one or more of the WirelessHD™ specifications, standards or variants, such as the WirelessHD Specification, Revision 1.0d7, Dec. 1, 2007, and its progeny as promulgated by WirelessHD, LLC (collectively referred to as the "WirelessHD Specification"). The WirelessHD Specification defines a next generation wireless digital network interface for consumer electronic products. Specifically, the WirelessHD Specification enables wireless connectivity for streaming high-definition content between various wireless devices, such as a source device and high-definition displays. The WirelessHD Specification defines a wireless protocol that enables the creation of a WVAN. In a current instantiation of the WirelessHD Specification, the MAC and PHY are defined to support the wireless delivery of uncompressed high definition audio and video at formats up to 1080 p at 60 Hertz (Hz) with 24 bit color at a range that is typically at least 10 meters. In addition, the delivery of compressed audio/visual (AV) streams and data is also supported at a similar range. An adaptation sub-layer enables network and service set up by supporting authentication, advanced device and connection control.

Although some embodiments may be described with reference to the WirelessHD Specification by way of example, it may be appreciated that the techniques described herein may also be implemented for other wireless standards as promulgated by other standards organizations as well, such as the International Telecommunications Union (ITU), the International Organization for Standardization (ISO), the International Electrotechnical Commission (IEC), the Institute of Electrical and Electronics Engineers (information IEEE), the Internet Engineering Task Force (IETF), and so forth. In various embodiments, for example, the communications system 100 may communicate information according to one or more IEEE 802.11 standards for wireless local area networks (WLANs) such as the information IEEE 802.11 standard (1999 Edition, Information Technology Telecommunications and Information Exchange Between Systems—Local and Metropolitan Area Networks—Specific Requirements, Part 11: WLAN Medium Access Control (MAC) and Physical (PHY) Layer Specifications), its progeny and supplements thereto (e.g., 802.11a, b, g/h, j, n, VHT SG, and variants); IEEE 802.15.3 and variants; IEEE 802.16 standards for WMAN including the IEEE 802.16 standard such as 802.16-2004, 802.16.2-2004, 802.16e-2005, 802.16f, and variants; next generation WirelessHD (NGmS) progeny and variants; European Computer Manufacturers Association (ECMA) TG20 progeny and variants; and other wireless networking standards. The embodiments are not limited in this context.

The communications system 100 may communicate, manage, or process information in accordance with one or more protocols. A protocol may comprise a set of predefined rules or instructions for managing communication among nodes. In various embodiments, for example, the communications system 100 may employ one or more protocols such as a beam forming protocol, medium access control (MAC) protocol, Physical Layer Convergence Protocol (PLCP), Simple Network Management Protocol (SNMP), Asynchronous Transfer Mode (ATM) protocol, Frame Relay protocol, Systems Network Architecture (SNA) protocol, Transport Control Protocol (TCP), Internet Protocol (IP), TCP/IP, X.25, Hypertext Transfer Protocol (HTTP), User Datagram Protocol (UDP), and so forth.

The communications system 100 also may be arranged to operate in accordance with standards and/or protocols for media processing. Examples of media processing standards include, without limitation, the High Definition Television (HDTV) standards as defined by the ITU Radiocommunication Sector (ITU-R), such as the Recommendation BT.709-5, Parameter Values for the HDTV Standards For Production and International Programme Exchange, published April 2002, the Digital Video Broadcasting Terrestrial (DVB-T) broadcasting standard, the ITU/IEC H.263 standard, Video Coding for Low Bitrate Communication, ITU-T Recommendation H.263v3, published November 2000 and/or the ITU/IEC H.264 standard, Video Coding for Very Low Bit Rate Communication, ITU-T Recommendation H.264, published May 2003, Motion Picture Experts Group (MPEG) standards (e.g., MPEG-1, MPEG-2, MPEG-4), and/or High performance radio Local Area Network (HiperLAN) standards. Examples of media processing protocols include, without limitation, Session Description Protocol (SDP), Real Time Streaming Protocol (RTSP), Real-time Transport Protocol (RTP), Synchronized Multimedia Integration Language (SMIL) protocol, and/or Internet Streaming Media Alliance (ISMA) protocol. The embodiments are not limited in this context.

As shown in FIG. 1, the communications system 100 may comprise a transmitter node 102 coupled to a plurality of receiver nodes 104-1-n, where n may represent any positive integer value. In various embodiments, the transmitter node 102 and the plurality of receiver nodes 104-1-n may be implemented as various types of wireless devices. Examples of wireless devices may include, without limitation, an IEEE 802.15.3 piconet controller (PNC), a controller, an IEEE 802.11 Private Basic Service Set (PBSS) Control Point (PCP), a coordinator, a station, a subscriber station, a base station, a wireless access point (AP), a wireless client device, a wireless station (STA), a laptop computer, ultra-laptop computer, portable computer, personal computer (PC), notebook PC, handheld computer, personal digital assistant (PDA), cellular telephone, combination cellular telephone/PDA, smartphone, pager, messaging device, media player, digital music player, set-top box (STB), appliance, workstation, user terminal, mobile unit, consumer electronics, television, digital television, high-definition television, television receiver, high-definition television receiver, and so forth. In such embodiments, the transmitter node 102 and the receiver nodes 104-1-n may comprise one more wireless interfaces and/or components for wireless communication such as one or more transmitters, receivers, transceivers, chipsets, amplifiers, filters, control logic, network interface cards (NICs), antennas, antenna arrays, and so forth. Examples of an antenna may include, without limitation, an internal antenna, an omni-directional antenna, a monopole antenna, a dipole antenna, an end fed antenna, a circularly polarized antenna, a micro-strip antenna, a diversity antenna, a dual antenna, an antenna array, and so forth. In one embodiment, certain devices may include antenna arrays of multiple antennas to implement various adaptive antenna techniques and spatial diversity techniques. Some embodiments for an enhanced bidirectional beam forming protocol are discussed in the context of using phased antenna arrays. The enhanced bidirectional beam forming protocol may be used with any type of antenna having a need for feedback information, and the embodiments are not limited in this respect. For example, while some aspects of an enhanced bidirectional beam forming protocol are designed to enable a phased antenna array at both ends of the link, a switched-sector antenna (e.g., an antenna with predefined few directions that can switch from one direction to another) may still use this protocol.

For purposes of illustration and not limitation, examples for an enhanced bidirectional beam forming protocol may be given with reference to WirelessHD networks, protocols and devices. It may be appreciated, however, that an enhanced bidirectional beam forming protocol may be implemented with other types of networks, protocols and devices. For example, an enhanced bidirectional beam forming protocol may be implemented for a NGmS network, protocol or devices, and still fall within the intended scope of the embodiments. The embodiments are not limited in this context.

In various embodiments, the transmitter node 102 and the receiver nodes 104-1-n may comprise or form part of a wireless network 106. In one embodiment, for example, the wireless network 106 may comprise a WVAN as defined by the WirelessHD Specification. In the context of a WVAN, both nodes 102, 104 may be implemented as WirelessHD compliant devices. In a WVAN, the transmitter node 102 may be communicatively coupled to one or more receiver nodes 104-1-n. In accordance with the WirelessHD Specification and nomenclature, one or both of the nodes 102, 104 may be implemented as a coordinator or a station. A coordinator is normally, but not always, a device that is a sink for media information (e.g., audio or video data). The coordinator typically includes a display, and in some cases a media storage device such as a personal video recorder (PVR), media server, or STB. A station may comprise a device that either has media information that it can source or sink, potentially at the same time.

Although some embodiments may be described with the wireless network 106 implemented as a WVAN network for purposes of illustration, and not limitation, it can be appreciated that the embodiments are not limited in this context. For example, the wireless network 106 may comprise or be implemented as various types of wireless networks and associated protocols suitable for a WPAN, a Wireless Local Area Network (WLAN), a Wireless Metropolitan Area Network, a Wireless Wide Area Network (WWAN), a Broadband Wireless Access (BWA) network, a radio network, a television network, a satellite network such as a direct broadcast satellite (DBS) network, and/or any other wireless communications network configured to operate in accordance with the described embodiments.

As shown in the embodiment of FIG. 1, the transmitter node 102 may be coupled to receiver nodes 104-1-n by wireless communication links 108-n. A particular wireless communication link (e.g., wireless communication link 108-1) may be arranged to establish one or more common or dedicated connections between the transmitter node 102 and a particular receiver node (e.g., receiver node 104-1). In various embodiments, a particular wireless communication link (e.g., wireless communication link 108-1) may include multiple virtual channels, with each of the virtual channels comprising a point-to-point logical connection from the transmitter node 102 to a particular receiver node (e.g., receiver node 104-1). In various implementations, multiple virtual channels may share a physical link, with each virtual channel comprising dedicated resources or bandwidth of the physical link.

In various embodiments, the nodes 102, 104 may communicate using a physical layer component (PHY), such as a high-rate PHY (HRP). In one embodiment, for example, the HRP supports multi-Gb/s throughput at a distance of approximately 10 meters through adaptive antenna technology. Because of this, the antenna pattern used for the HRP is highly directional. The HRP is optimized for the delivery of uncompressed high-definition video, although other data can be communicated using the HRP. To support multiple video resolutions, the HRP has more than one data rate defined. The HRP carries isochronous data such as audio and video, asynchronous data, MAC commands, antenna beam forming information, and higher layer control data for A/V devices. It may be appreciated that the use of HRP and LRP are for WirelessHD devices, and other types of PHYs may be used for other types of devices. With respect to the NGmS protocol, for example, the high rate PHY may be referred to as the OFDM PHY or the SC PHY depending on the modulation type, while the low rate PHY is called a CONTROL PHY or a MCS of the SC PHY. In the latter case, the low rate transmissions will be based on wide bandwidth with significant processing gain that renders the transmission more robust. Other types of high rate and low rate PHYs may be used for different types of devices, and the embodiments are not limited in this context.

In various embodiments, the nodes 102, 104 may also communicate using a low-rate PHY (LRP). The LRP is a multi-Mb/s bidirectional link that also provides a relatively short range (e.g., 10 meters). One or more data rates are defined for the LRP, with the lower data rates having near omni-directional coverage while the highest data rates are directional, although this is not necessarily binding. For example, some arrangements may use higher data rates of LRP in almost-omni directional transmissions. Because the LRP has near omni-directional modes, it can be used for both unicast and broadcast connections. Furthermore, because all stations support the LRP, it can be used for station-to-station links for WirelessHD devices, although this may not be possible for NGmS devices. The LRP supports multiple data rates, including directional modes, and is used to carry low-rate isochronous data such as audio, low-rate asynchronous data, MAC commands including the beacon, acknowledgements for HRP packets, antenna beam forming information, capabilities information, and higher layer control data for A/V devices.

In some cases (not all) the HRP and LRP may operate in overlapping frequency bands and so they are coordinated by the MAC. The media access scheme may include a time division multiple access (TDMA) format, a frequency division multiple access (FDMA) format, a TDMA/FDMA format, a code division multiple access (CDMA), a wide-band CDMA (WCDMA) format, an orthogonal frequency division multiple access (OFDMA) format, and so forth. The embodiments are not limited in this context.

The WVAN typically supports two types of devices. In one embodiment, for example, a WVAN may support a coordinator and a station. The coordinator controls the timing in the piconet, keeps track of the members of the WVAN, is able to transmit and receive using the LRP, may be able to transmit data using the HRP, and may be able to receive data using the HRP. A station is able to transmit and receive using the LRP, may initiate stream connections, may be able to transmit data using the HRP, and may be able to receive data using the HRP. A station may be capable of acting as a coordinator in the WVAN. Such a station is referred to as being coordinator capable.

In addition to the two MAC personalities of coordinator and station, each device in a WirelessHD WVAN will have one of four different PHY capabilities as shown in Table 1 as follows:

TABLE 1

| PHY | Description |
| --- | --- |
| HR0 | A device that is not able to either receive or transmit using the HRP |
| HRRX | A device that is able to receive in the HRP, but is not able to transmit using the HRP |
| HRTX | A device that is able to transmit in the HRP, but is not able to receive using the HRP |
| HRTR | A device that is able to both transmit and receive using the HRP |

All compliant WirelessHD devices are able to transmit and receive using the LRP. Both the HRP and LRP may provide multiple data rates, as specified in the WirelessHD Specification.

In various embodiments, the transmitter node 102 and the receiver nodes 104-1-n may be arranged to communicate various types of media information in multiple communication frames. The various types of media information may include image information, audio information, video information, AV information, and/or other data provided from the media source 108. In various embodiments, the information may be associated with one or more images, image files, image groups, pictures, digital photographs, music file, sound files, voice information, videos, video clips, video files, video sequences, video feeds, video streams, movies, broadcast programming, television signals, web pages, user interfaces, graphics, textual information (e.g., encryption keys, serial numbers, e-mail messages, text messages, instant messages, contact lists, telephone numbers, task lists, calendar entries, hyperlinks), numerical information, alphanumeric information, character symbols, and so forth. The information also may include command information, control information, routing information, processing information, system file information, system library information, software (e.g., operating system software, file system software, application software, game software), firmware, an application programming interface (API), a program, an applet, a subroutine, an instruction set, an instruction, computing code, logic, words, values, symbols, and so forth.

The transmitter node 102 may be arranged to receive media content from a media source node 110 to be unicast and/or multicast to one or more of the receiver nodes 104-1-n. In various embodiments, the transmitter node 102 may be arranged to receive media content from the source node 110. The media source node 110 generally may comprise any media source capable of delivering static or dynamic media content to the transmitter node 102. In one embodiment, for example, the media source node 110 may comprise a multimedia server arranged to provide broadcast or streaming media content to the transmitter node 102. In some implementations, the media source node 110 may form part of a media distribution system (DS) or broadcast system such as an over-the-air (OTA) broadcast system, a radio broadcast system, a television broadcast system, a satellite broadcast system, and so forth. In some implementations, the media source node 110 may be arranged to deliver media content pre-recorded and stored in various formats for use by a device such as a Digital Versatile Disk (DVD) device, a Video Home System (VHS) device, a digital VHS device, a digital camera, video camera, a portable media player, a gaming device, and so forth.

As shown in the embodiment of FIG. 1, for example, the transmitter node 102 may be coupled to the media source node 110 through a communication medium 112. The communication medium 112 generally may comprise any medium capable of carrying information signals such as a wired communication link, wireless communication link, or a combination of both, as desired for a given implementation. In various embodiments, the communication medium 112 may comprise a wired communication link implemented as a wired Ethernet and/or P2P connection, for example. In such embodiments, information may be communicated over the communication medium 112 in accordance with the information IEEE 802.3, and the transmitter node 102 may receive media content from the media source node 110 substantially loss-free.

Although some embodiments may be described with the communication medium 112 implemented as a wired Ethernet and/or P2P connection for purposes of illustration, and not limitation, it can be appreciated that the embodiments are not limited in this context. For example, the communication medium 112 between the transmitter node 102 and the source node 110 may comprise various types of wired and/or wireless communication media and, in some cases, may traverse one or more networks between such devices.

The transmitter node 102 may be arranged to buffer media content and to parse or fragment the media content into communication frames for unicast or multicast transmission to the receiver nodes 104-1-n. In some implementations, the transmitter node 102 may be arranged to parse or fragment the received media content as it is read into a buffer. In some embodiments, the media content provided to the transmitter node 102 may be delivered as one or more media frames. Each media frame may comprise a discrete data set having a fixed or varying length, and may be represented in terms of bits or bytes such as 16 kilobytes (kB), for example. It can be appreciated that the described embodiments are applicable to various types of communication content or formats, such as frames, packets, fragments, cells, units, and so forth.

In various embodiments, the transmitter node 102 may be arranged to create a sequence of media frames to be broadcast over one or more of the wireless communication links 108-1-n. Each media frame may comprise a discrete data set having fixed or varying lengths, and may be represented in terms of bits or bytes. While multicasting, each media frame may contain a destination address comprising a group address corresponding to multiple intended recipients, such as receiver nodes 104-1-n. In some embodiments, the destination address may refer to all receiver nodes 104-1-n within the wireless network 106.

Figure 2:
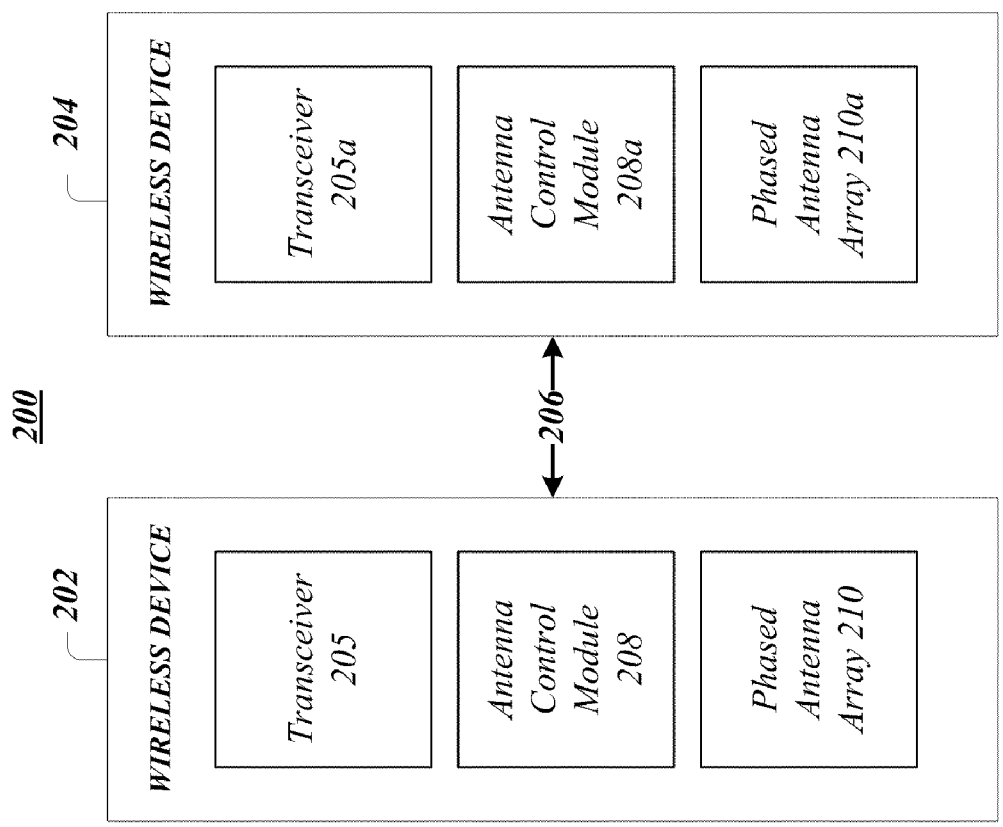
FIG. 2 illustrates one embodiment of a wireless network.

FIG. 2 illustrates a block diagram of one embodiment of a wireless network 200. For ease of illustration, and not limitation, the wireless network 200 depicts a limited number of nodes by way of example. It can be appreciated that more nodes may be employed for a given implementation.

As shown, the wireless network 200 may comprise a wireless device 202 coupled to a wireless device 204. In various embodiments, the wireless communications system 200 may comprise or be implemented by one or more elements of the communications system 100 of FIG. 1, such as wireless network 100, transmitter node 102, and receiver nodes 104-1-n. The embodiments are not limited in this context.

In one embodiment, for example, the wireless device 202 and the wireless device 204 may be implemented as WirelessHD compliant devices, and the wireless network 200 may be implemented as a WVAN network. In such an embodiment, the wireless network 200 may communicate information in accordance with the WirelessHD Specification and associated techniques, and the wireless device 202 may comprise a WirelessHD compliant device communicatively coupled to the wireless device 204 comprising another WirelessHD compliant device. In various implementations, the wireless network 200 may support a unicast and/or multicast communication environment for distributing media content by unicasting and/or multicasting from the wireless device 202 to the wireless device 204. Typically, the wireless devices 202, 204 will utilize unicast or multicast techniques based upon the type of channel being used. For example, the wireless devices 202, 204 will utilize unicast techniques when using a HRP channel, and multicast techniques when using a LRP channel. The embodiments are not limited in this context.

In one embodiment, for example, the wireless devices 202, 204 each may include the capability to establish one or more wireless communications channels 206 using respective transceivers 205, 205a coupled to respective antenna control modules 208, 208a coupled to respective phased antenna arrays 210, 210a. In various embodiments, the communications channel 206 may be implemented at the MAC layer of the communication protocol stack within a transceiver and/or wireless communication chipset of a wireless device.

Figure 3:
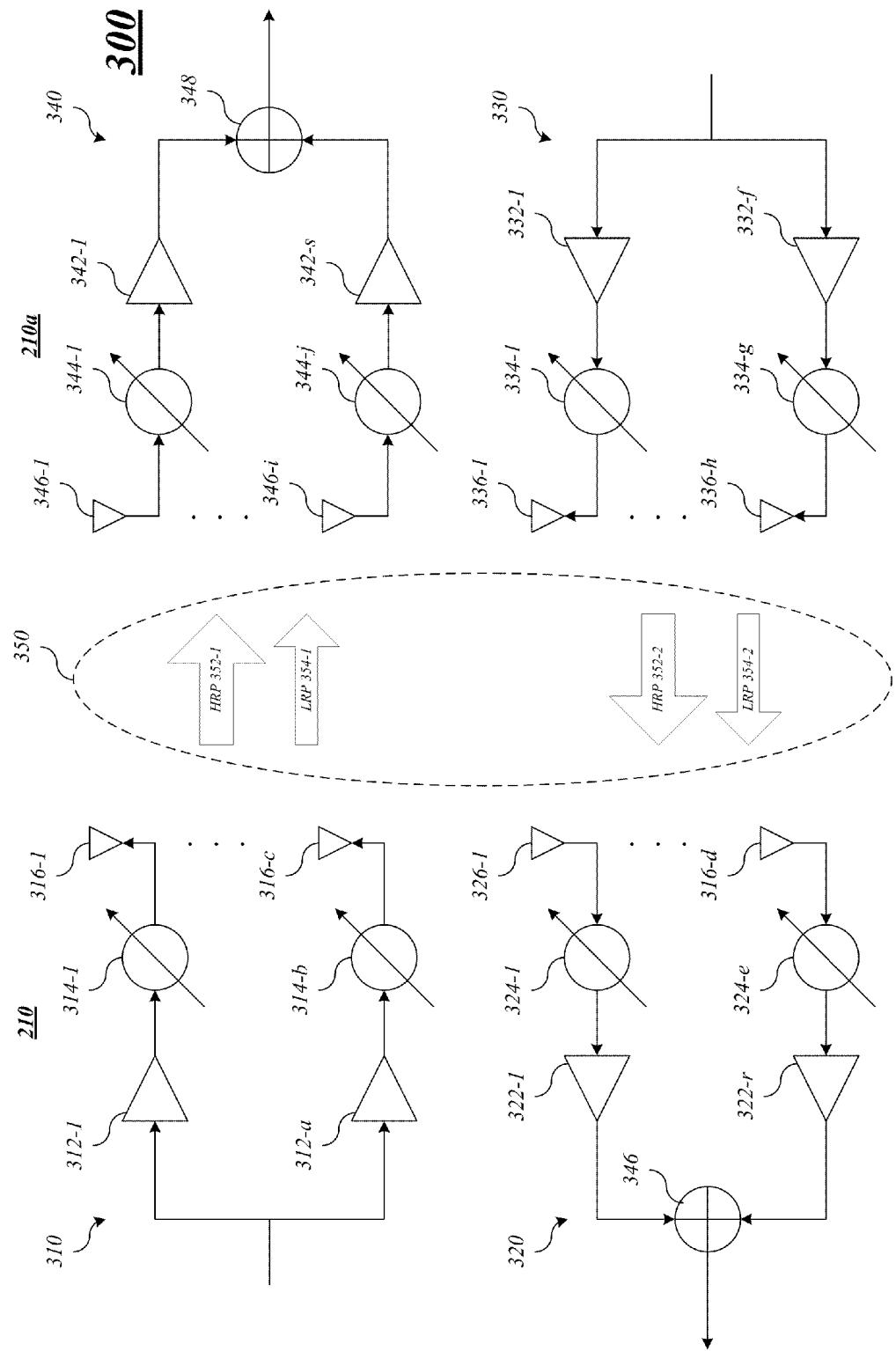
FIG. 3 illustrates one embodiment of a phased antenna array.

FIG. 3 illustrates one embodiment of wireless system 300 suitable for performing analog beam forming. The wireless system 300 may be implemented for the nodes 102, 104-1-n as described with reference to FIG. 1, and/or the wireless nodes 202, 204 as described with reference to FIG. 2.

In the illustrated embodiment shown in FIG. 3, the wireless system 300 may comprise a more detailed diagram for a pair of phased antenna arrays 210, 210a implemented for respective wireless devices 202, 204. The phased antenna arrays 210, 210a may be communicatively coupled to the respective antenna control modules 208, 208a. The phased antenna array 210 may comprise a transmitter antenna array 310 and a receiver antenna array 320. The phased antenna array 210a may comprise a transmitter antenna array 330 and a receiver antenna array 340. Although the antenna arrays 310, 320 and the antenna arrays 330, 340 may be illustrated a separate antenna arrays, it may be appreciated that each may be implemented using a single antenna array using different transmit and receive coefficients, vectors or other suitable antenna parameters.

The transmitter antenna arrays 310, 330 may comprise respective power amplifiers 312-1-$a$ and power amplifiers 332-1-$f$ each coupled to respective phase shifters 314-1-$b$ and phase shifters 334-1-$g$. The phase shifters 314-1-$b$ and phase shifters 334-1-$g$ may each be coupled to respective antennas 316-1-$c$ and antennas 336-1-$h$. The receiver antenna arrays 320, 240 may comprise respective antennas 326-1-$d$ and antennas 346-1-$i$ each coupled to respective phase shifters 324-1-$e$ and phase shifters 344-1-$j$. The phase shifters 324-1-$e$ and phase shifters 344-1-$j$ may each be coupled to respective low noise amplifiers (LNA) 322-1-$r$ and LNA 342-1-$s$, which are in turn each coupled to respective combiners 346, 348. It may be appreciated that the transmitter and receiver chains can share phase shifters and/or amplifiers as desired for a given implementation. The embodiments are not limited in this context.

The wireless devices 202, 204 may use the respective phased antenna arrays 210, 210a to communicate control information and media information over a wireless shared media 350. The transmitter antenna array 310 and the receiver antenna array 340 of the respective wireless devices 202, 204 may communicate information using an HRP channel 352-1 and/or a LRP channel 354-1. The transmitter antenna array 330 and the receiver antenna array 320 of the respective wireless devices 204, 202 may communicate information using an HRP channel 352-2 and/or a LRP channel 354-2. In one embodiment, the HRP channels 352-1, 352-2 may be implemented as directional channels operating at higher rate data communication speeds, and the LRP channels 354-1, 354-2 may be implemented as omni-directional channels operating at lower rate data communications speeds.

The antenna control modules 208, 208a may use the respective transceivers 205, 205a and respective phased antenna arrays 210, 210a to perform beam forming operations. The beam forming operations may include explicit feedback beam forming, which supports all types of WirelessHD compliant devices, such as HR0, HRRX, HRTX and HRTR. There is no requirement that the transmitter and the receiver for a station are the same and no calibration is required. The beam forming operations may also include implicit feedback beam forming, which is typically used when both the source and destination are HRTR capable.

In order to provide data rates on the order of Gbps at approximately 10 meters for 60 GHz mmWave operations, the phased antenna arrays 210, 210a are implemented as high gain antenna networks in the 60 GHz frequency band. The phased antenna arrays 210, 210a can create beams that can be steered around obstacles to find a best path between the wireless devices 202, 204. The antenna control modules 208, 208a may cooperate to implement an enhanced bidirectional beam forming protocol suitable for beam search and beam tracking operations. Beam search is a technique of estimating transmitter and receiver antenna-array weight vectors (AWVs) that result in a desired beam with an acceptable level of gain or SNR over the HRP channels 352-1, 352-2. Beam tracking is a technique of tracking transmitter and receivers AWVs that correspond to an existing beam over time due to small perturbations of the HRP channels 352-1, 352-2. While beam search is typically a stand-alone technique using a dedicated time interval, beam tracking takes place during data transfer and is appended to existing HRP packets and corresponding ACK packets.

Figure 4:
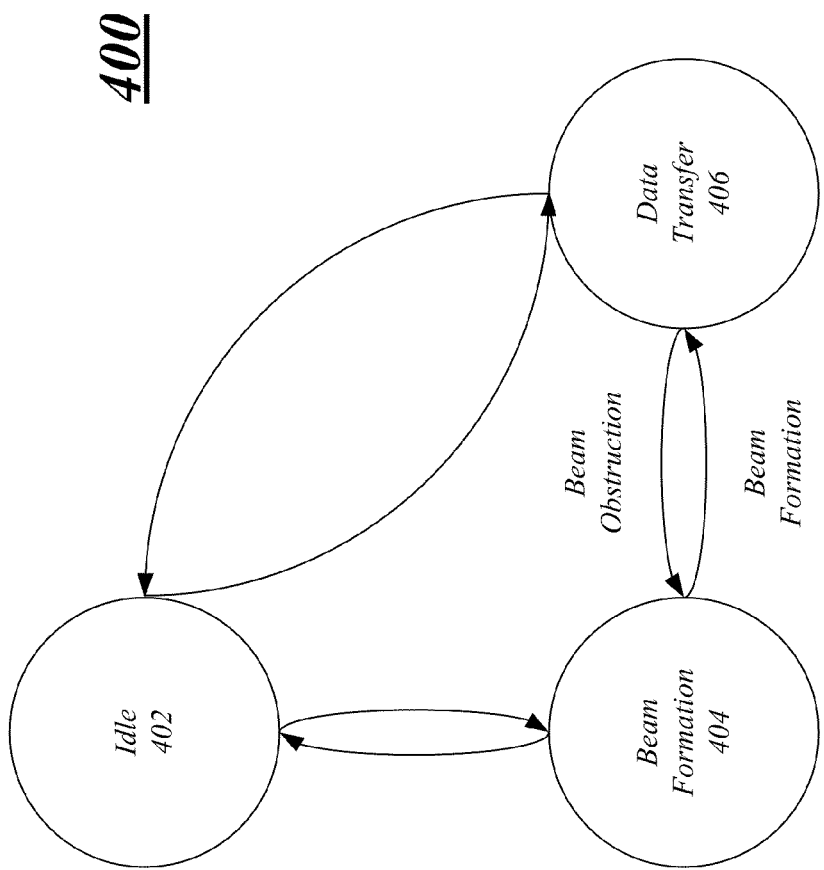
FIG. 4 illustrates one embodiment of a state diagram.

FIG. 4 illustrates one embodiment of a state diagram 400. The state diagram 400 illustrates state transitions for adaptive beam forming using the phased antenna arrays 210, 210a. In the illustrated embodiment shown in FIG. 4, the wireless device 202 may be in an idle state 402, and detect a peer device (e.g., wireless device 204) within communication range of the wireless device 202. The wireless device 202 may exit the idle state 402, and enter a beam formation state 404. The wireless device 202 may initiate beam formation operations using an iterative training scheme to form a pair of communications channels HRP 352-1, 352-2 between the wireless devices 202, 204. For example, the antenna control module 208 for the wireless device 202 may be arranged to communicate training signals and feedback information with the wireless device 204 via the transceiver 205 and phased antenna array 210. The information is communicated using exclusively the HRP channels 352-1, 352-2, while reducing or eliminating the need to use the LRP channels 354-1, 354-2. This reduces training time for the devices. The antenna control module 208 iteratively determines AWVs for a directional transmit beam pattern for the phased antenna array 210 using feedback information from the wireless device 204. Once trained the wireless devices 202, 204 may exit the beam formation state 404, and enter a data transfer state 406 to use the HRP channels 352-1, 352-2 for bidirectional high rate data communications.

Figure 5:
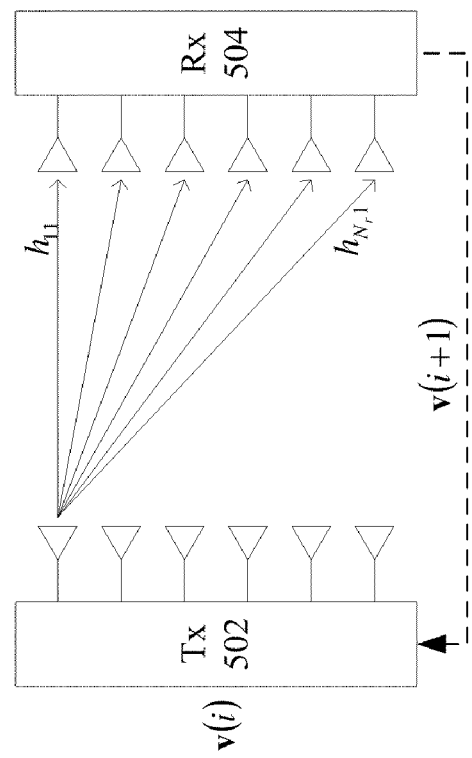
FIG. 5 illustrates one embodiment of an iterative training scheme.

FIG. 5 illustrates one embodiment of iterative training scheme for a wireless system 500. Since the path loss in the 60 GHz frequency band is very high and the efficiency of CMOS power amplifiers at 60 GHz is low, directional transmission is needed to achieve the desired 10 meter coverage. The array gain from transmit and receive beam forming operations is needed to acquire the desired SNR for reliable data communications. Currently, there are several different beam forming protocols to acquire directional transmissions. The first beam forming protocol uses the sectored antenna approach, which switches among several preformed beams. The second beam forming protocol uses phased antenna arrays where transmit and receive beams are formed by changing the phases of the input and output signals of each antenna element, as described with reference to FIG. 3.

The second beam forming protocol uses an iterative training approach. An iterative training process utilizes training sequences and feedback in successive iterations in order to train transmitters or receivers. The iterative training approach provides the advantage of distributing transmit power to multiple power amplifiers, and the beam can be adaptively steered. It is worthy to note that this discussion is limited to only a single data stream for purposes of clarity, although some embodiments may be implemented for multiple data streams as well. A brief overview of iterative training is provided below to better illustrate and describe the operations and benefits of the enhanced bidirectional beam forming protocol.

In one embodiment, the desired beam forming weights at the receiver (Rx) 504 and transmitter (Tx) 502, denoted by vectors u and v, maximize the gain of the beamformed channel as shown in Equation (1) as follows:

$$(u, v) = \underset{\|\hat{u}\|=\|\hat{v}\|=1}{\mathrm{argmax}} |\hat{u}^H H \hat{v}| \quad (1)$$

where H is the effective channel matrix between transmitter 502 and receiver 504; $\hat{u}^H H \hat{v}$ is the beam formed scalar channel for beam forming weights $\hat{u}$ and $\hat{v}$; and u and v are the normalized beam forming vectors at the receiver 504 and transmitter 502 respectively. The effective channel matrix incorporates the effects of the transmit/receive weighting matrixes and the wireless channel, and it is the product of the transmit weighting matrix $B_t$, wireless channel $H_w$, the receive weighting matrix $B_r$, e.g., $H=B_r H_w B_t$. The weight entries on the i-th row of $B_r$ form the i-th effective receive antenna and similarly the weight entries on the i-th column of $B_t$ form the i-th effective transmit antenna. The entry on the i-th row and j-th column of H is the channel response between the i-th effective receive antenna and the j-th effective transmit antenna. If H is known, then u and v can be computed using the singular value decomposition (SVD) of H. However, H is usually unknown at both transmitter 502 and receiver 504 for 60 GHz systems. Consequently, iterative training is used as an efficient scheme to obtain u and v, and which does not require costly training to learn about the whole H.

Beam forming is needed before the transmission of the data packet. In current protocols and for a P2P scheduled training, and for systems without RF transceiver chain calibration, the beam forming weights of the phased antenna arrays are gradually refined during the beam refinement phase that consumes a significant overhead of about 400 microseconds (μs), for example. It is desirable to reduce the training overhead as much as possible for high network throughput. In the state of the art, iterative training is the scheme employed for the beam refinement because of its superior performance. It is iterative and each iteration has two steps, e.g., the training of maximum ratio combining (MRC) weights and the training of the maximum ratio transmission (MRT) weights, as shown in FIG. 5 and Equation (2) as follows.

Step 1: $u(i)=\text{norm}(Hv(i))$

Step 2: $v(i+1)=\text{norm}(H^H u(i))$ \hfill (2)

where $$\text{norm}(x) = \frac{x}{\|x\|}$$

normalizes the magnitude of the beam forming vector. For clarity and simplicity, the noise term is not evaluated. At the i-th iteration, the transmitter 502 has the transmit beam forming vector v(i), which comes from the feedback from the receiver 504.

In the first step in Equation (2), the transmitter 502 sends training symbols to the receiver 504 using v(i), and the receiver 504 estimates the receive beam forming weights that maximize the received signal strength for the transmit vector v(i) as follows. The receiver measures the response on each effective receive antenna respectively, and the measured responses form the vector Hv(i). The receive beam forming vector maximizing the received signal (e.g., the MRC vector), is shown in Equation (3) as follows:

$u(i)=\text{norm}(Hv(i))$ \hfill (3)

In the second step in Equation (2), the transmitter 502 sends training symbols through each effective transmit antenna respectively and the receiver 504 estimates the transmit beam forming weights that maximize the received signal strength for the receive vector u(i) as follows. The receiver uses u(i) as the receive vector and measures the beam formed channel response for each effective transmit antenna in H respectively. The measured channel responses form the vector $u^H(i)H$. The transmit beam forming vector maximizing the received signal (e.g., the MRT vector), is shown in Equation (4) as follows:

$v^H(i+1)=\text{norm}(u^H(i)H)$ or $v(i+1)=\text{norm}(H^H u(i))$ \hfill (4)

The value for v(i+1) is fed back to the transmitter 502 for the (i+1)-th iteration. The values for u(i) and v(i) gradually converges to the ideal u and v as each iteration completes.

Iterative training is currently used by certain conventional beam forming protocols, such as those currently implemented by the WirelessHD Specification. The conventional beam forming protocol utilized by the WirelessHD Specification, however, introduces a significant amount of training overhead and link latency. It is also designed for training a link in one direction at a time, which may be suitable to digital television sets that are designed to operate mainly as receivers and less as transmitters. A PC environment is different, however, and focus is placed on both transmitting and receiving operations. The enhanced bidirectional beam forming protocol reduces link latency for training bidirectional links, and is described in further detail with reference to FIG. 6.

Figure 6A:
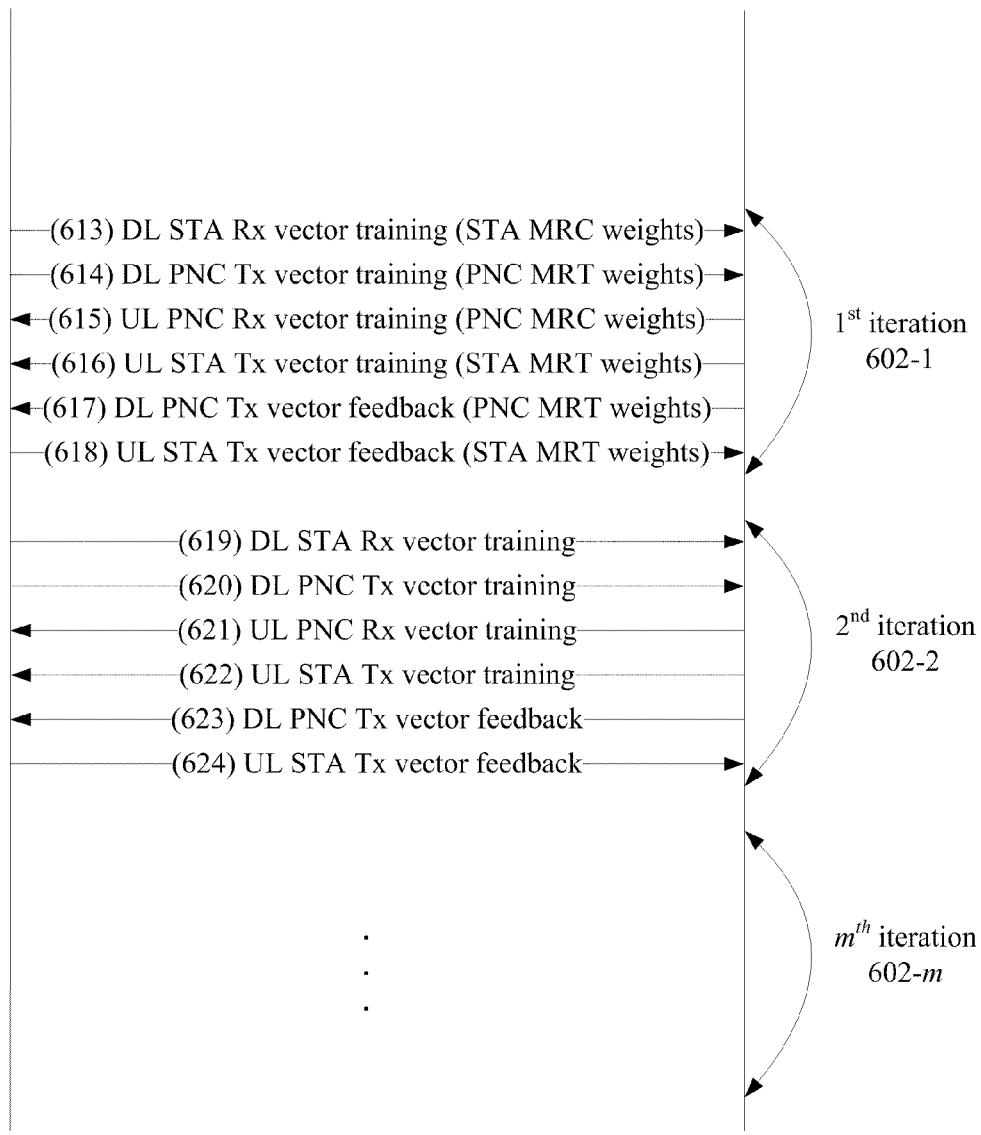
FIG. 6A illustrates one embodiment of a first message flow.

FIG. 6A illustrates one embodiment of a message flow 600. The message flow 600 illustrates a message flow for an enhanced bidirectional beam forming protocol that reduces latency introduced by an iterative training scheme by using only HRP channels 352-1, 352-2, while reducing or eliminating the need to use the LRP channels 354-1, 354-2. For purposes of illustration and not limitation, the wireless device 202 may represent a piconet controller (PNC) or coordinator, and the wireless device 204 may represent a wireless station (STA). In one embodiment, the message flow 600 may be applicable for WirelessHD devices, although the embodiments are not limited in this respect.

In the illustrated embodiments shown in FIG. 6A, the wireless device 202 exits the idle state 402 and enters the beam forming state 404. The wireless device 202 may optionally transmit timing acquisition and optimal delay selection sequences to the wireless device 204. The antenna control module 208 of the wireless device 202 cooperates with the antenna control module 208a of the wireless device 204 to implement an iterative training scheme using an enhanced bidirectional beam forming protocol. The iterative training scheme may use any number of iterations 602-1-m as desired for a given implementation.

During a first iterative training 602-1, the antenna control module 208 uses the transceiver 205 and the phased antenna array 510 of the wireless device 202 to send training signals, such as training signals 613, from the wireless device 202 to the wireless device 204 over a downlink (DL) HRP channel 352-1. In a typical scenario, multiple training signals are transmitted, while the wireless device 202 changes its antenna weights at proper times (e.g., at the beginning of every training signal). For example, the antenna control module 208 sends receiver (Rx) training signals 613 from the wireless device 202 to the wireless device 204 over the DL HRP channel 352-1 to allow the wireless device 204 to deduce the MRC weights and form a directional receive beam pattern for a phased antenna array 210a of the wireless device 204. The antenna control module 208 sends transmitter (Tx) training signals 614 from the wireless device 202 to the wireless device 204 over the DL HRP channel 352-1 to allow the device 204 to measure characteristics of its received signal. These characteristics are later fed back from device 204 to device 202 using message 617 to allow wireless device 202 to deduce its MRT weights so that a directional transmit beam pattern for the phased antenna array 210 of the wireless device 202 can be formed.

In a conventional beam forming protocol, the antenna control module 208 may wait to receive feedback information from the wireless device 204 over the LRP channel 354-1. In the enhanced bidirectional beam forming protocols, however, the feedback information from the wireless device 204 is delayed until a directional receive beam pattern for the phased antenna array 210 of the wireless device 202 as been formed or partially formed, thereby allowing the wireless device 202 to receive the feedback information from the wireless device 204 over an uplink (UL) HRP channel 352-2. The UL HRP channel 352-2 operates at a much higher data rate than the LRP channel 354-1, and therefore using the UL HRP channel 352-2 for the feedback information reduces training overhead and latency.

Referring again to the message flow 600, the antenna control module 208a uses the transceiver 205a and the phased antenna array 210a of the wireless device 204 to send training signals or sequences to the wireless device 202 over the UL HRP channel 352-2. For example, the antenna control module 208a sends training signals 615 to the wireless device 202 over the UL HRP channel 352-2 to deduce the MRC weights and form a directional receive beam pattern for the phased antenna array 210 of the wireless device 202. The antenna control module 208a also sends training signals 616 to the wireless device 202 over the UL HRP channel 352-2 to allow the wireless device 202 to measure characteristics of its received signal. These characteristics are later fed back from device 202 to device 204 using message 618 to allow wireless device 204 to deduce its MRT weights so that a directional transmit beam pattern for the phased antenna array 210a of the wireless device 204 can be formed.

Once the phased antenna array 210 of the wireless device 202 has a fully or partially formed directional receive beam pattern using the weights (e.g., MRC weights) obtained at arrow 615, the wireless device 204 may send feedback information to the wireless device 202 over the UL HRP channel 352-2, which is received using the directional receive beam pattern for the phased antenna array 210 of the wireless device 202, as indicated by the arrow 617. The phased antenna array 210a may use the same transmit beam forming vector as used when previously sending the UL PNC Rx vector training (PNC MRC weights) (arrow 615). This provides the wireless device 202 with receive gain that may not have been available prior to stage 615 or earlier.

The antenna control module 208 may determine AWVs for the directional transmit beam pattern for the phased antenna array 210 of the wireless device 202 using the feedback information from the wireless device 204. The first iteration 602-1 may then be completed by having the wireless device 202 send feedback information to the wireless device 204 over the DL HRP channel 352-1 using a directional transmit beam pattern obtained from recently received feedback information (arrow 617) for the phased antenna array 210 of the wireless device 202. The phased antenna array 210a of the wireless device 204 may use the directional receive beam pattern formed when receiving the DL STA Rx vector training (STA MRC weights) at arrow 613 to receive the feedback information. The antenna control module 208a may then use the feedback information in determining AWVs for the directional transmit beam pattern for the phased antenna array 210a of the wireless device 204 using the feedback information from the wireless device 202.

The wireless devices 202, 204 may continue with the next iterative trainings 602-2-m performing similar beam forming or beam refinement operations as used with the first iterative training 602-1. For example, for iterative training 602-2 the operations indicated by arrows 619 through 624 are similar to those operations performed as indicated by arrows 613 through 618. Each iterative training 602-1-m provides successively more accurate AWVs for the HRP channels 352-1, 352-2. This process continues until a terminating condition is reached, such as reaching a determined SNR for data communications, reaching a determined number of iterations (e.g., three iterations), or until both ends of the link request termination of the training process. At this point, the HRP channels 352-1, 352-2 may be used for bidirectional high rate data communications.

It is worthy to note that the feedback information provided at arrow 617 may optionally be moved back and provided during stage 616. This may add synchronization overhead, however, because of the transmit/receive switching.

Figure 6B:
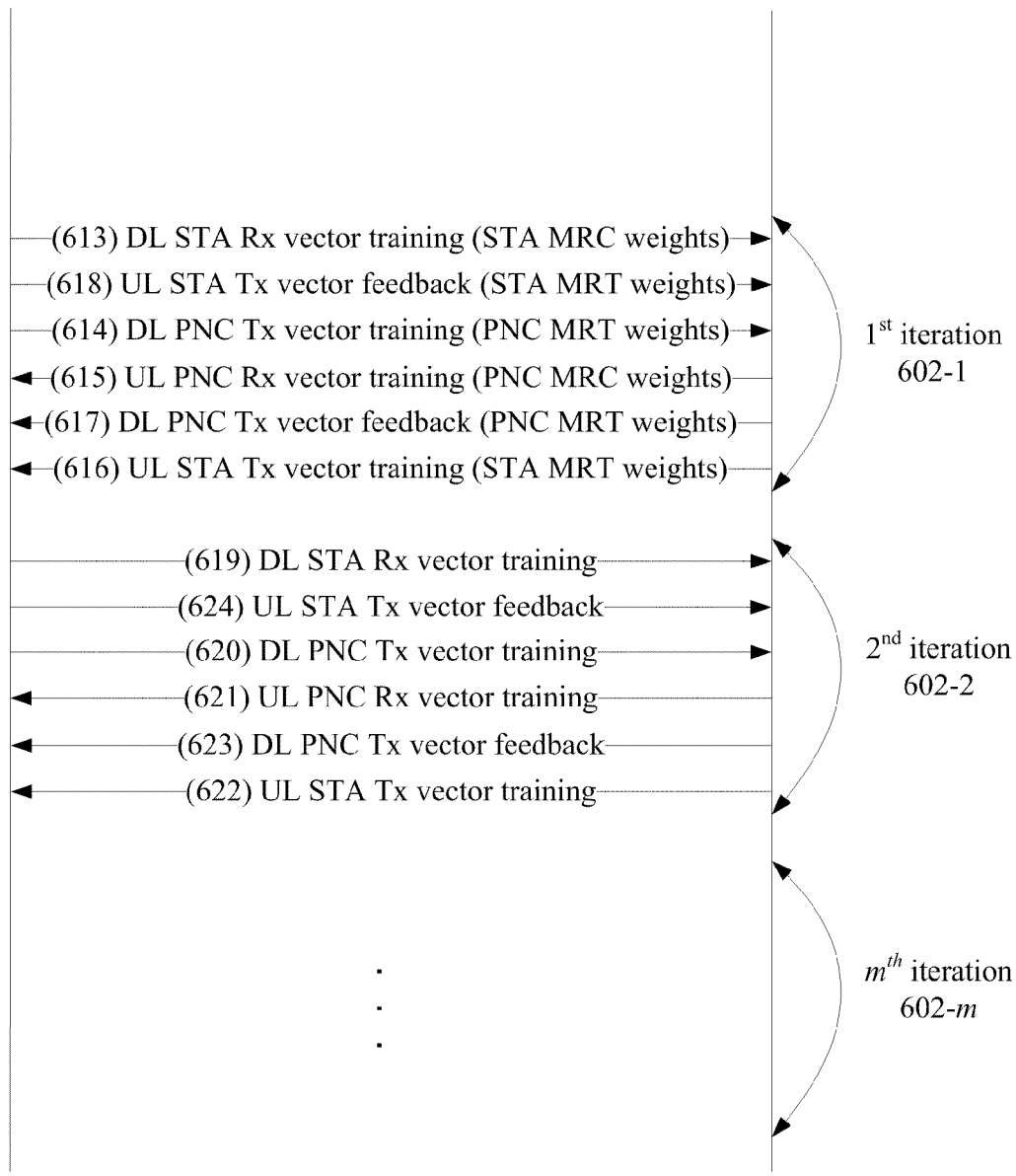
FIG. 6B illustrates one embodiment of a second message flow.

FIG. 6B illustrates one embodiment of a message flow 650. The message flow 650 illustrates a message flow for an enhanced bidirectional beam forming protocol that reduces latency introduced by an iterative training scheme by using predominantly HRP channels 352-1, 352-2, while reducing or eliminating the need to use the LRP channels 354-1, 354-2. For purposes of illustration and not limitation, the wireless device 202 may represent a piconet controller (PNC) or coordinator, and the wireless device 204 may represent a wireless station (STA). In one embodiment, the message flow 650 may be applicable for NGmS devices, although the embodiments are not limited in this respect.

In the illustrated embodiments shown in FIG. 6A, the message flow 650 illustrates a message flow suitable for an enhanced bidirectional beam forming protocol implemented for a NGmS network, protocol or devices. The NGmS protocol, for example, may contain DL RX training, DL feedback and DL TX training, followed by UL RX training, UL feedback and UL TX training, where the DL feedback is feedback sent over a downlink corresponding to UL TX training that was previously transmitted.

The message flow 650 of FIG. 6B is similar to the message flow 600 described with reference to FIG. 6A, with a different sequencing for the training signals and messages. As shown in the message flow 650, signals and/or messages 613 to 618 are reordered in the following sequence: 613, 618, 614, 615, 617 and 616. It may be appreciated that this sequencing provides the following characteristics: (1) all arrows in the same direction may be grouped together to form a single packet; and (2) in a group there is RX training, feedback information and then TX training. Unlike message flow 600, where the feedback information can correspond to current iteration training, the message flow 650 corresponds to previous iteration training. The embodiments are not limited in this context.

Figure 7:
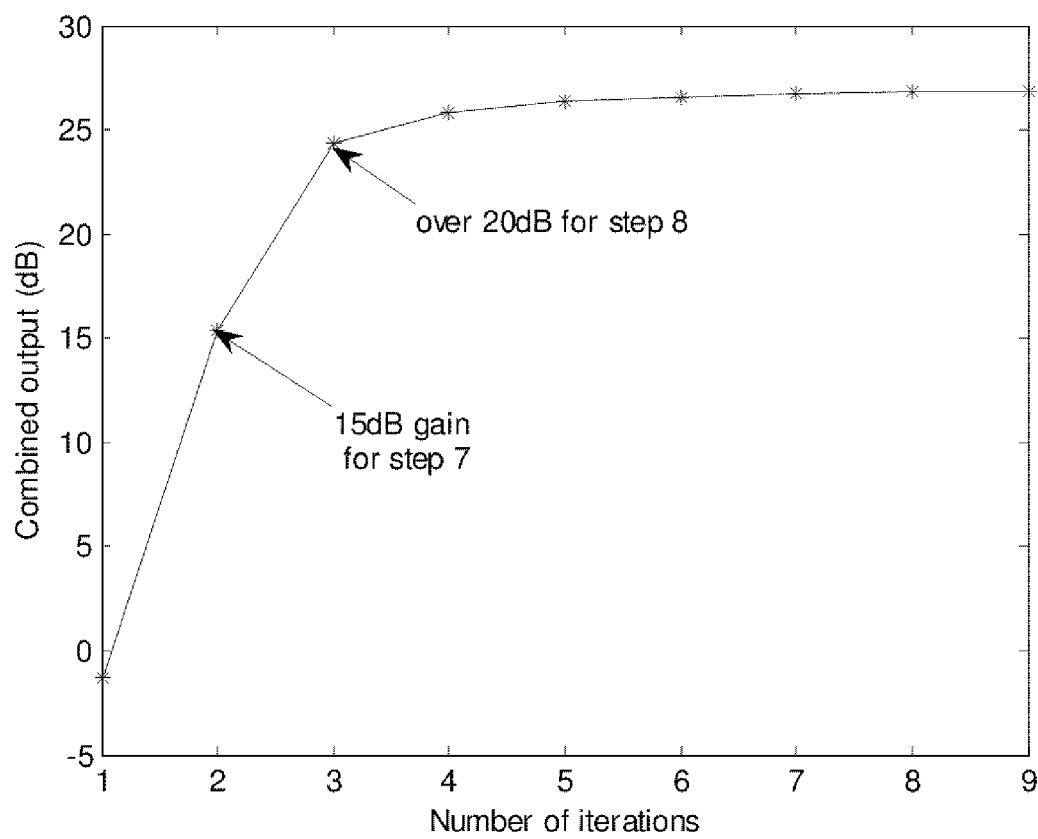
FIG. 7 illustrates one embodiment of a graph for beam forming gain.

FIG. 7 illustrates one embodiment of a graph 700 for beam forming gain. The graph 700 provides a number of iterations on a x-axis and a combined output (dB) on a y-axis. As a result of the enhanced bidirectional beam forming protocol, the feedback at arrow 618 is sent with approximately 15-25 dB beam forming gain (depending on which iteration) due to performing both transmit and receive beam forming. For example, approximately 15 dB gain may be achieved in the first iteration 602-1, and 5-6 dB additional gain may be achieved in the second iteration 602-2. After the second iteration 602-2, progressively smaller gains are realized by each successive iteration (e.g., 602-3 through 602-9). These SNR improvements enable much faster feedback for beam forming operations without calibration. These results correspond to 32 or 36 antenna elements on both sides.

Figure 8:
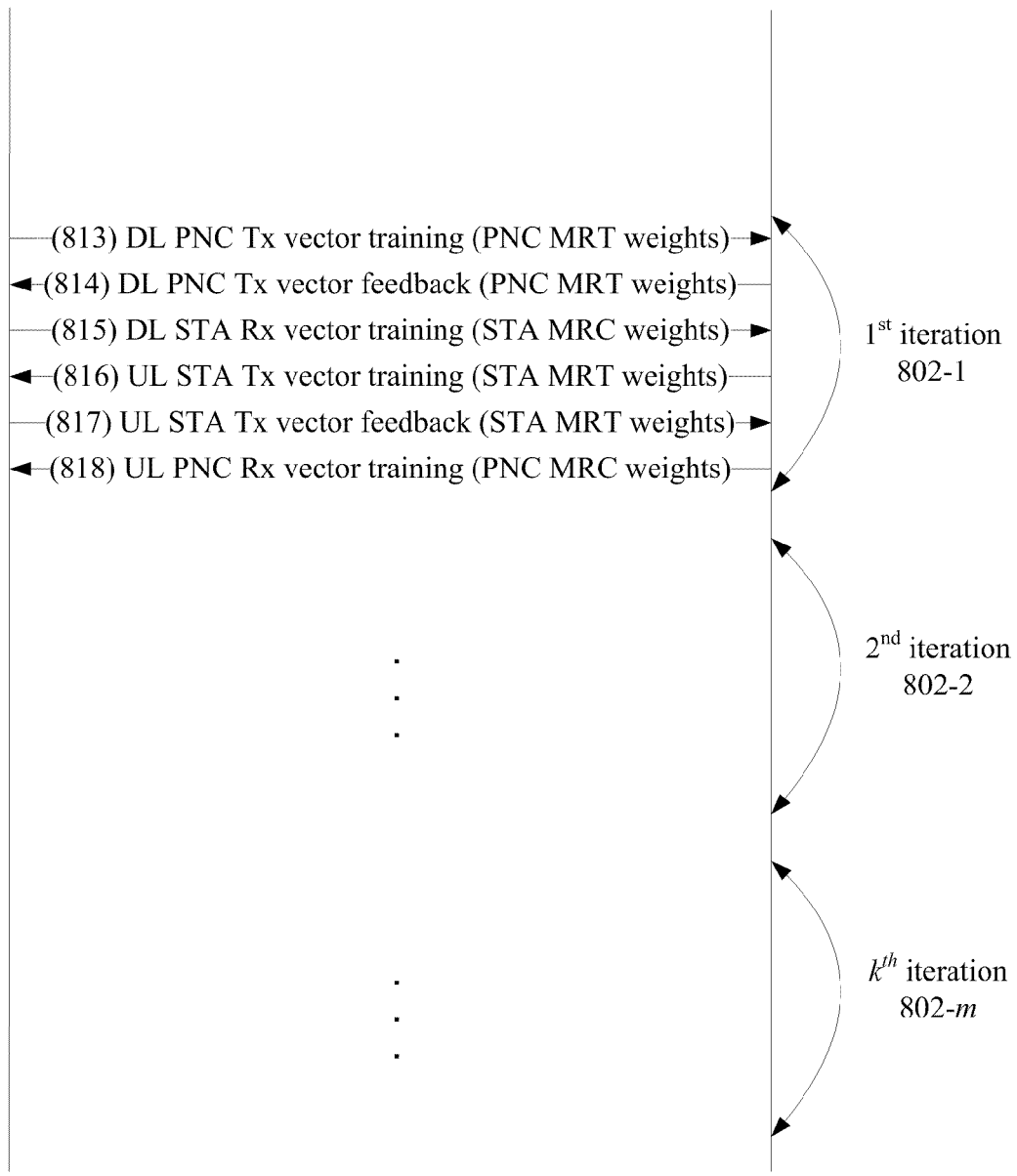
FIG. 8 illustrates one embodiment of a third message flow.

FIG. 8 illustrates one embodiment of a message flow 800. The message flow 800 illustrates an alternative message flow for an enhanced bidirectional beam forming protocol that reduces latency introduced by an iterative training scheme by using the HRP channels 352-1, 352-2, while reducing or limiting the need to use the LRP channels 354-1, 354-2. For purposes of illustration and not limitation, the wireless device 202 may represent a piconet controller (PNC) or coordinator, and the wireless device 204 may represent a wireless station (STA).

Similar to the message flow 600, the message flow 800 attempts to coordinate transmit and receive beam forming operations to allow feedback information to be provided over the HRP channels 352-1, 352-2. The wireless device 202 exits the idle state 402 and enters the beam forming state 404. The wireless device 202 utilizes the message flow 800 to initiate bidirectional beam formation operations using an iterative training scheme to form a pair of communications channels for a WPAN or WVAN. The message flow 800 interleaves transmit and receive beam forming operations to allow use of partially trained links to communicate feedback information at a higher data rate. More particularly, the message flow 800 interleaves transmit and receive beam forming operations for the wireless devices 202, 204 to allow feedback information received by the wireless device 202 from the wireless device 204 to be communicated over the HRP channels 352-1, 352-2. This reduces the need to use the LRP channels 354-1, 354-2 during beam forming operations.

In the illustrated embodiment shown in FIG. 8, the message flow 800 begins with optional timing acquisition and optimal delay selection operations. During a first iterative training 802-1, the antenna control module 208 sends transmitter (Tx) training signals 813 from the wireless device 202 to the wireless device 204 over the DL HRP channel 352-1 to allow the device 204 to measure characteristics of its received signal. The wireless device 202 receives feedback information 814 from the wireless device 204 over the UL LRP 354-2 to deduce its MRT weights. The antenna control module 208 of the wireless device 202 determines AWVs for the directional transmit beam pattern for the phased antenna array 210 of the wireless device 202 using the feedback information 814 from the wireless device 204.

The wireless device 202 then sends Rx training signals (STA MRC weights) to the wireless device 204 over the DL HRP 352-1 to allow the wireless device 204 to deduce and form a directional receive beam pattern for the phased antenna array 210a of the wireless device 204, as indicated by arrow 815. The wireless device 202 receives Tx training signals (STA MRT weights) from the wireless device 204 over the UL HRP 352-2 to form a directional transmit beam pattern for the phased antenna array 210a of the wireless device 204, as indicated by arrow 816.

The antenna control module 208 uses the transceiver 205 and the phased antenna array 510 of the wireless device 202 to send training signals 815 from the wireless device 202 to the wireless device 204 over a downlink DL HRP channel 352-1 to allow the wireless device 204 to deduce the MRC weights and form a directional receive beam pattern for a phased antenna array 210a of the wireless device 204. The antenna control module 208a also sends training signals 816 to the wireless device 202 over the UL HRP channel 352-2 to allow the wireless device 202 to measure characteristics of its received signal.

The wireless device 202 sends feedback information 817 to the wireless device 204 over the DL HRP 352-1 using a directional transmit beam pattern for the phased antenna array 210 of the wireless device 202. The feedback information 817 is carried using a partially trained link obtained in the recent half-iteration. As a result, the feedback information 817 is much more robust and efficient than using only the DL LRP channel 354-1. The wireless device 204 uses the feedback information to determine AWVs for the directional transmit beam pattern for the phased antenna array 210a of the wireless device 204 using the feedback information 817 from the wireless device 202.

To complete the first iterative training 802-1, the wireless device 202 receives training signals 818 by the wireless device 202 from the wireless device 204 over the UL HRP 352-2 to deduce MRC weights and form a directional receive beam pattern for the phased antenna array 210 of the wireless device 202.

The wireless devices 202, 204 may continue with the next iterative trainings 802-2-k performing similar beam forming or beam refinement operations as used with the first iterative training 802-1. For example, the wireless device 202 may receive additional feedback information from the wireless device 204 over the UL HRP 352-2 using the directional receive beam pattern for the phased antenna array 210 of the wireless device 202 during the second iterative training 802-2. The antenna control module 210 may determine AWVs for the directional transmit beam pattern for the phased antenna array 210 of the wireless device 202 using the additional feedback information from the wireless device 204. Each iterative training 802-1-k provides successively more accurate AWVs for the HRP channels 352-1, 352-2. This process continues until a terminating condition is reached, such as reaching a determined SNR for data communications or reaching a determined number of iterations (e.g., three iterations). At this point, the HRP channels 352-1, 352-2 may be used for bidirectional high rate data communications.

The enhanced bidirectional beam forming protocol utilizes partially trained links to provide a higher data rate for the feedback information during the feedback stages. In the WirelessHD Specification, by way of contrast, feedback stages after the first one are done using "directional" mode, which is a selected antenna pattern. With non-calibrated antennas, a random antenna pattern may yield less than 0 dBi in certain directions. The directional mode is expected to be around 0 dBi as it is the best among few random choices. An additional advantage of the enhanced bidirectional beam forming protocol is that the beamformer need not transfer the selected antenna pattern for the directional mode to the beamformee, since the next time feedback is already going to be over a beamformed link, which is properly trained.

Figure 9:
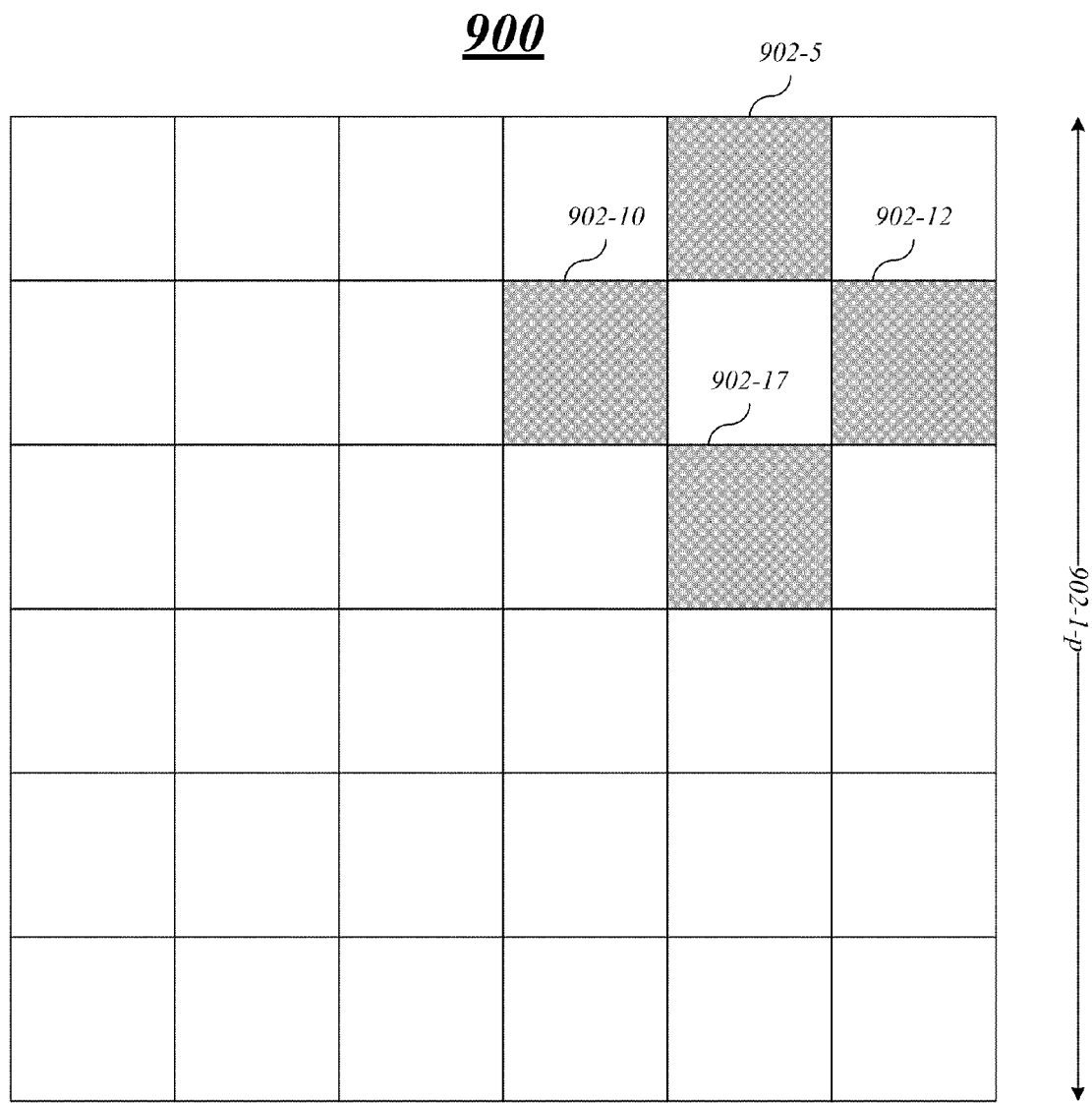
FIG. 9 illustrates one embodiment of a phased antenna array.

FIG. 9 illustrates one embodiment of a phased array antenna 900. The phased array antenna 900 may be representative of, for example, the phased array antennas 210, 210a. In the illustrated embodiment shown in FIG. 9, the phased array antenna 900 may comprise multiple antenna elements 902-1-p.

In some embodiments, the enhanced bidirectional beam forming protocol may train a subset of antenna elements 902-1-p from the phased array antenna 900. The first few iterations of beam forming operations may be of reduced time and quality. When the phased antenna array 900 is implemented by the wireless device 202, and has 36 antenna elements 902-1 through 902-36, then the antenna control module 208 can couple some of the antenna elements 902-1 through 902-36 together and generate training for fewer overall antenna elements 902-1 through 902-36. This shortens the time of the training in the first iterative trainings and may still capture some of the expected antenna gain. An example for such coupling is depicted in FIG. 9, where four (4) antenna elements 902-5, 902-10, 902-12 and 902-17 marked in crosshatchings, for example, are always phase shifted by the same amount, such as 90 degrees, 180 degrees or 270 degrees. This results in essentially eight (8) to nine (9) antenna elements made from the 6×6 phased antenna array 900.

By way of example, referring again to the exemplary message flows 600, 800, the wireless device 202 may send Tx training signals to the wireless device 204 over the DL HRP 352-1 to form a directional transmit beam pattern for a subset of antenna elements 902-1-$p$ of the phased antenna array 210 of the wireless device 202.

Additionally or alternatively, the wireless devices 202, 204 may exchange additional information during the enhanced bidirectional beam forming protocol that may accelerate beam forming operations. For example, similar to the way that the WirelessHD Specification uses to identify the proper antenna pattern index for the directional mode, the enhanced bidirectional beam forming protocol can add additional information types to certain stages of beam forming operations, such a needed modulation and coding scheme (MCS) for the wireless devices 202, 204. An information field of defined length (e.g., 3 bits) may be used to communicate the MCS information. The MCS information may be communicated, for example, with the transmitter training signals in either link direction in order to assist in generating the feedback information during the feedback stages. Other types of information other than MCS information may be sent during different stages of the enhanced bidirectional beam forming protocol, and the embodiments are not limited in this context.

In embodiments, the feedback information may correspond to measurements done at the receiver and is largely unaware of the antenna patterns applied by the transmitter. An example of feedback information may comprise a channel estimation per given delay, among others. In some embodiments, the amount of feedback information may be uniform. Additionally or alternatively, the wireless devices 202, 204 may exchange increasing amounts of feedback information during the feedback stages of the enhanced bidirectional beam forming protocol to accelerate beam forming operations. When the HRP channels 352-1, 352-2 are partially or fully formed, and the feedback overhead becomes cheaper, then one or both of the wireless devices 202, 204 can increase the amount of feedback information provided over the HRP channels 352-1, 352-2 at certain stages and/or iterative trainings so that the overall beam forming training time is reduced.

Operations for various embodiments may be further described with reference to the following figures and accompanying examples. Some of the figures may include a logic flow. It can be appreciated that an illustrated logic flow merely provides one example of how the described functionality may be implemented. Further, a given logic flow does not necessarily have to be executed in the order presented unless otherwise indicated. In addition, a logic flow may be implemented by a hardware element, a software element executed by a processor, or any combination thereof. The embodiments are not limited in this context.

FIG. 10 illustrates one embodiment of a logic flow 1000 for selecting a channel pair to form a new wireless network between two or more devices. In various embodiments, the logic flow 1000 may be performed by various systems, nodes, and/or modules and may be implemented as hardware, software, and/or any combination thereof, as desired for a given set of design parameters or performance constraints. For example, the logic flow 1000 may be implemented by a logic device (e.g., transmitter node, receiver node) and/or logic comprising instructions, data, and/or code to be executed by a logic device. For purposes of illustration, and not limitation, the logic flow 1000 is described with reference to FIG. 1. The embodiments are not limited in this context.

In one embodiment, for example, the logic flow 1000 may initiate beam formation operations using an iterative training scheme to form a pair of communications channels for a wireless network at block 1002. For example, the wireless device 202 may initiate beam formation operations using an iterative training scheme to form a pair of communications channels (352-1, 352-2) for a 60 GHz mmWave WPAN or WVAN. The embodiments are not limited in this context.

In one embodiment, for example, the logic flow 1000 may communicate training signals and feedback information between a first device and a second device using only high rate channel at block 1004. For example, may communicate training signals and feedback information between the wireless devices 202, 204 using only HRP channels 352-1, 352-2. The embodiments are not limited in this context.

In one embodiment, for example, the logic flow 1000 may determine antenna-array weight vectors for a directional transmit beam pattern for a phased antenna array of the first device using feedback information from the second device at block 1006. For example, the antenna control module 208 of the wireless device 202 may determine AWVs for a directional transmit beam pattern for the phased antenna array 210 of the wireless device 202 using feedback information from the wireless device 204. The embodiments are not limited in this context.

Figure 11:
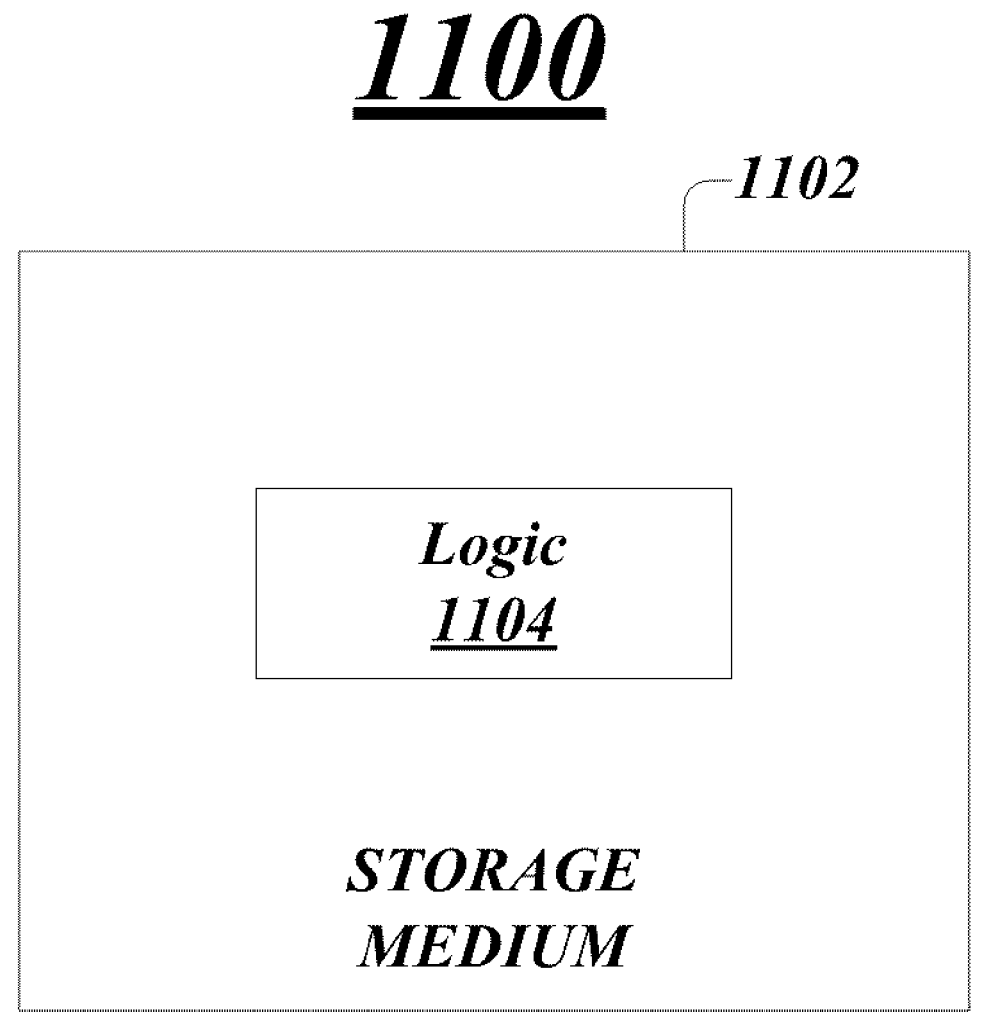

FIG. 11 illustrates one embodiment of an article of manufacture 1100. As shown, the article 1100 may comprise a storage medium 1102 to store logic 1104 for selecting a channel pair to form a new wireless network between two or more devices. For example, logic 1104 may be used to implement the channel selection module 208, as well as other aspects of the transmitter node (102, 202) and/or the receiver nodes (104-1-$n$, 204). In various embodiments, the article 1100 may be implemented by various systems, nodes, and/or modules.

The article 1100 and/or machine-readable storage medium 1102 may include one or more types of computer-readable storage media capable of storing data, including volatile memory or, non-volatile memory, removable or non-removable memory, erasable or non-erasable memory, writeable or re-writeable memory, and so forth. Examples of a machine-readable storage medium may include, without limitation, random-access memory (RAM), dynamic RAM (DRAM), Double-Data-Rate DRAM (DDR-DRAM), synchronous DRAM (SDRAM), static RAM (SRAM), read-only memory (ROM), programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory (e.g., ferroelectric polymer memory), phase-change memory (e.g., ovonic memory), ferroelectric memory, silicon-oxide-nitride-oxide-silicon (SONOS) memory, disk (e.g., floppy disk, hard drive, optical disk, magnetic disk, magneto-optical disk), or card (e.g., magnetic card, optical card), tape, cassette, or any other type of computer-readable storage media suitable for storing information. Moreover, any media involved with downloading or transferring a computer program from a remote computer to a requesting computer carried by data signals embodied in a carrier wave or other propagation medium through a communication link (e.g., a modem, radio or network connection) is considered computer-readable storage media.

The article 1100 and/or machine-readable medium 1102 may store logic 1104 comprising instructions, data, and/or code that, if executed by a machine, may cause the machine to perform a method and/or operations in accordance with the described embodiments. Such a machine may include, for example, any suitable processing platform, computing platform, computing device, processing device, computing system, processing system, computer, processor, or the like, and may be implemented using any suitable combination of hardware and/or software.

The logic 1104 may comprise, or be implemented as, software, a software module, an application, a program, a subroutine, instructions, an instruction set, computing code, words, values, symbols or combination thereof. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Perl, Matlab, Pascal, Visual BASIC, assembly language, machine code, and so forth. The embodiments are not limited in this context. When implemented the logic 1104 is implemented as software, the software may be executed by any suitable processor and memory unit.

It is worthy to note that although the terms "downlink" and "uplink" channels are used when describing some embodiments, these terms are used to differentiate between two different channels being used between two different devices. Alternate terms may include a "first" channel and a "second" channel, a "forward" channel and a "reverse" channel, and any other suitable labels. Any two channels between any two devices may be used with an enhanced bidirectional beam forming protocol as described herein, and still fall within the scope of the embodiments. The embodiments are not limited in this context.

It is also worthy to note that the increased gain provided by an enhanced bidirectional beam forming protocol may be realized at any point during iterative training operations due to variations in the iterative training operations for different types of protocols (e.g., WirelessHD, NGmS, and so forth), and flexibility in modifying a particular implementation for interleaving operations in support of bidirectional beamforming operations. For example, the increased gain from communicating feedback information as described with reference FIG. 6B may be realized during the first iteration or second iteration depending on a particular implementation. The embodiments are not limited in this context.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It is also worthy to note that any reference to "one embodiment" or "an embodiment" means that a particular feature, structure, or characteristic described in connection with the embodiment is included in at least one embodiment. Thus, appearances of the phrases "in one embodiment" or "in an embodiment" in various places throughout the specification are not necessarily all referring to the same embodiment. Furthermore, the particular features, structures or characteristics may be combined in any suitable manner in one or more embodiments.

While certain features of the embodiments have been illustrated as described herein, many modifications, substitutions, changes and equivalents will now occur to those skilled in the art. It is therefore to be understood that the appended claims are intended to cover all such modifications and changes as fall within the true spirit of the embodiments.

The invention claimed is:

1. A wireless device, comprising:
a phased antenna array;
a transceiver communicatively coupled to the phased antenna array; and
an antenna control module communicatively coupled to the transceiver and the phased antenna array, the antenna control module operative to:
initiate beam formation operations using an iterative training scheme to form a pair of communications channels for a wireless network wherein the pair of communication channels includes a high rate physical (HRP) channel and a low rate physical (LRP) channel, the establishment of the HRP channel includes;
sending training signals to a peer device over the HRP channel and receiving feedback information from the peer device over the LRP channel;
determining antenna-array weight vectors (AWV) for a directional transmit beam pattern for a phase antenna array based on the feedback information;
receive training signals from the peer device over the HRP channel; and
send feedback information to the peer device over the HRP channel.

2. The wireless device of claim 1, the antenna control module operative to send transmitting timing acquisition sequences over the HRP channel.

3. The wireless device of claim 2, the antenna control module operative to send transmitting delay selection sequences over the HRP channel.

4. The wireless device of claim 1, the antenna control module operative to send transmitter training signals to the peer device over the HRP channel, the transmitter training signals for use in forming the directional transmit beam pattern for the phased antenna array.

5. The wireless device of claim 1, the antenna control module operative to receive receiver training signals from the peer device over the HRP to form a directional receive beam pattern for the phased antenna array.

6. The wireless device of claim 5, the antenna control module operative to receive feedback information from the peer device over the LRP channel using the directional receive beam pattern for the phased antenna array.

7. The wireless device of claim 1, the antenna control module operative to receive transmitter training signals from the peer device over the HRP to form a directional transmit beam pattern for a phased antenna array of the second device.

8. The wireless device of claim 1, the antenna control module operative to send feedback information to the peer device over the HRP channel using the directional transmit beam pattern for the phased antenna array, the feedback information for use in determining antenna-array weight vectors for a directional transmit beam pattern for a phased antenna array of the peer device.

9. The wireless device of claim method of claim 1, the antenna control module operative to continue beam forming operations using multiple iterations until a determined signal-to-noise ratio for data communications is reached or a determined number of iterations is reached.

10. A method of beam forming in mmWave communication system comprising:
   initiating beam formation operations using an iterative training scheme to establish a pair of communications channels for a wireless network wherein the pair of communication channels includes a high rate physical (HRP) channel and a low rate physical (LRP) channel, the establishment of the HRP channel includes;
   sending, by a first device, training signals to a second device over the HRP channel and receiving, by the first device, feedback information from the second device over the LRP channel;
   determining antenna-array weight vectors (AWV) for a directional transmit beam pattern for a phase antenna array based on the feedback information;
   receiving, by the first device, training signals from the second device over the HRP channel; and
   sending, by the first device, feedback information to the second device over the HRP channel.

11. The method of claim 10, wherein establishing the HRP channel comprising transmitting timing acquisition sequences.

12. The method of claim 10, wherein establishing the HRP channel comprising transmitting delay selection sequences.

13. The method of claim 10, comprising sending transmitter training signals from the first device to the second device over the HRP channel to form the directional transmit beam pattern for the phased antenna array of the first device.

14. The method of claim 10, comprising receiving receiver training signals by the first device from the second device over the HRP channel to form a directional receive beam pattern for the phased antenna array of the first device.

15. The method of claim 10, comprising receiving transmitter training signals by the first device from the second device over the HRP channel to form a directional transmit beam pattern for a phased antenna array of the second device.

16. The method of claim 10, comprising:
   receiving feedback information by the first device from the second device over the LRP channel using a directional receive beam pattern for the phased antenna array of the first device; and
   determining antenna-array weight vectors for the directional transmit beam pattern for the phased antenna array of the first device using the feedback information from the second device.

17. The method of claim 10, comprising sending feedback information from the first device to the second device over the HRP channel using a directional transmit beam pattern for the phased antenna array of the first device, the feedback information for use in determining antenna-array weight vectors for a directional transmit beam pattern for a phased antenna array of the second device using the feedback information from the first device.

18. The method of claim 10, comprising communicating training signals and feedback information, and determining antenna-array vector weights for the directional transmit beam pattern for the phased antenna array of the first device, using multiple iterations until a determined signal-to-noise ratio for data communications is reached or until a determined number of iterations is reached.

* * * * *